L. B. WELCH.
CONVERTIBLE SEAT FOR AUTOMOBILES.
APPLICATION FILED JUNE 19, 1920.
1,369,150.
Patented Feb. 22, 1921.
2 SHEETS—SHEET 1.
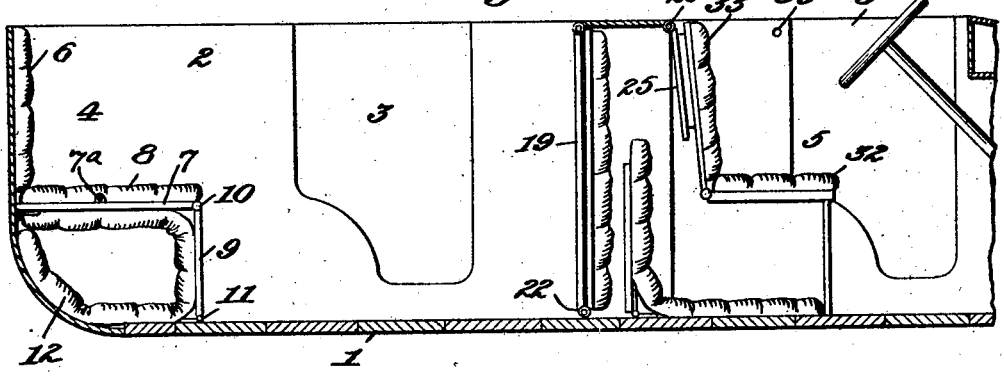
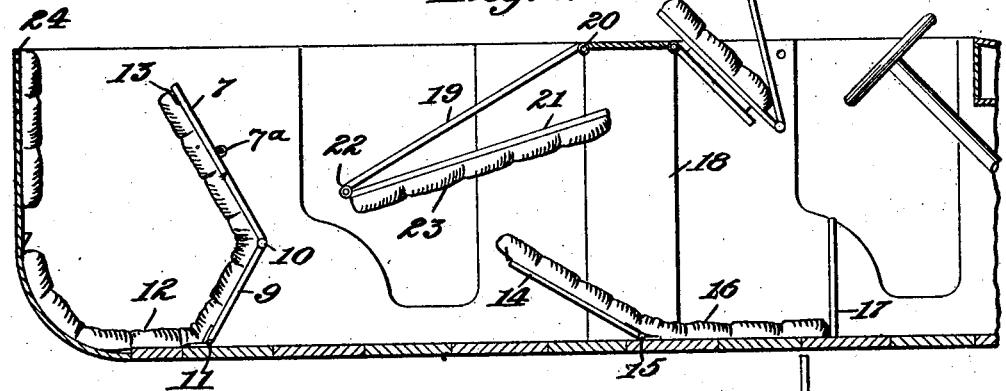
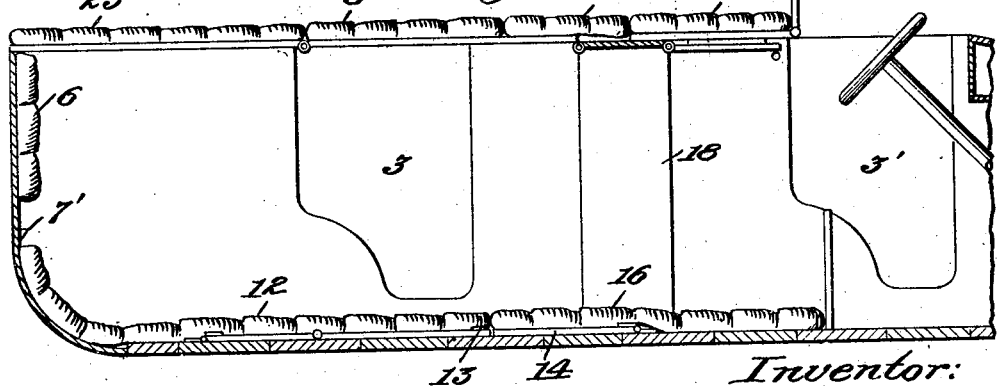
Inventor:
Lorenzo B. Welch,
Fenton B. Brock
Att'y.

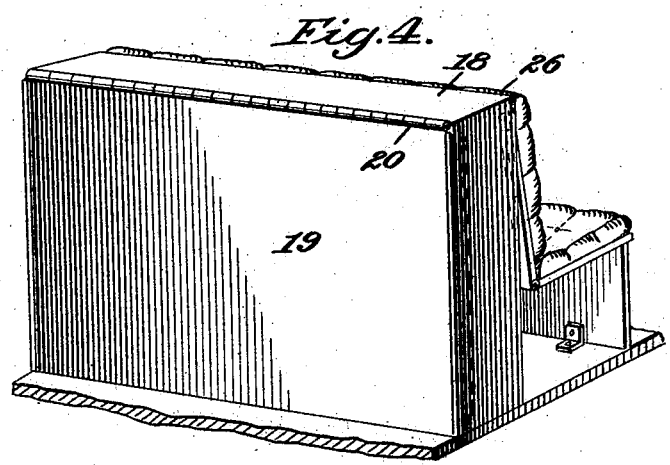
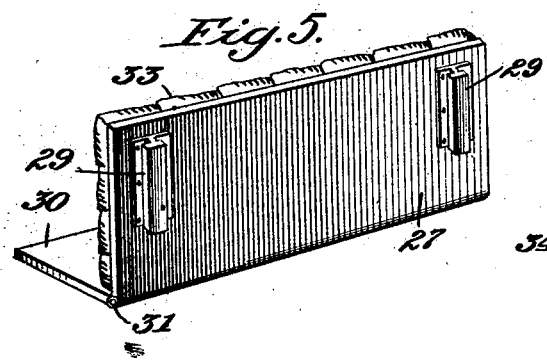
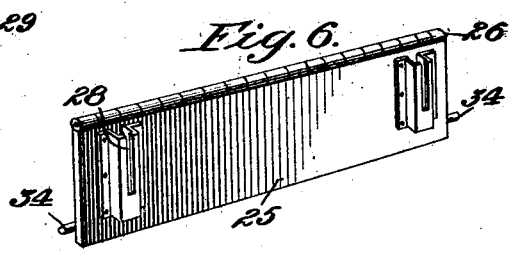
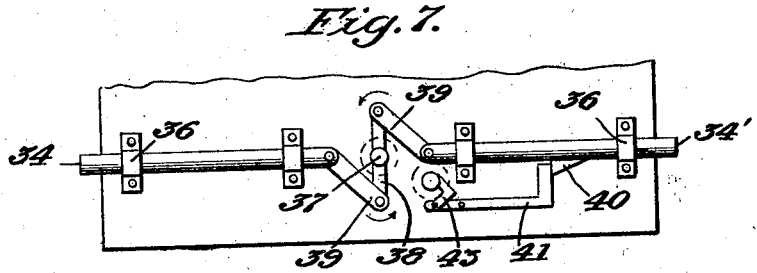

UNITED STATES PATENT OFFICE.

LORENZO B. WELCH, OF FORT SMITH, ARKANSAS.

CONVERTIBLE SEAT FOR AUTOMOBILES.

1,369,150.  Specification of Letters Patent.  Patented Feb. 22, 1921.

Application filed June 19, 1920. Serial No. 390,136.

*To all whom it may concern:*

Be it known that I, LORENZO B. WELCH, a citizen of the United States, and a resident of Fort Smith, in the county of Sebastian and State of Arkansas, have invented certain new and useful Improvements in Convertible Seats for Automobiles, of which the following is a specification.

The invention contemplates certain novel combinations and arrangements of parts whereby the front and rear seats of an automobile or similar vehicle may be converted for use as upper and lower berths in the vehicle; and the invention also involves certain novel features of construction in connection with the seats of the automobile whereby an upper berth may be supported at the top of the body of the vehicle and a lower berth made up on the floor of the vehicle, and the upholstery or cushions of the seats are utilized as mattresses or bedding for the berths.

The invention consists essentially in the novel construction of the front and rear seat members and auxiliary parts illustrated in the accompanying drawings and set forth in the appended claims, it being understood that various changes in proportion, size and details in construction within the scope of the claims may be made or resorted to without departing from the spirit of the invention.

In the accompanying drawings I have illustrated one complete example of the physical embodiment of my invention constructed and arranged according to the best mode I have so far devised for the practical application of the principles of the invention.

Figure 1 is a longitudinal, vertical, sectional view showing so much of an automobile of standard type, as is necessary for illustrating my invention, the seats being shown in normal position for use.

Fig. 2 is a view similar to Fig. 1, showing the foldable parts of the seat structures in positions they assume in the process or performance of converting the seats from their normal positions to positions for use as beds or berths.

Fig. 3 shows the beds made up and ready for use.

Fig. 4 is a perspective detail view of the front seat structure.

Fig. 5 is a detail view of the front seat back board and seat board.

Fig. 6 is a detail view of the supporting panel for the front seat members.

Fig. 7 is a detail view of a bolt or device for locking the front seat members in elevated position.

The invention is adaptable for use as a component part of the automobile during its process of assembling or manufacture, or with equal facility the invention may be applied to many existing types of cars as now in use.

For convenience of illustration I have shown in the drawings a conventional form of passenger automobile in which the floor is indicated as 1, the sides as 2 and the rear and front doors as 3 and 3' respectively. The seats as a whole are designated as 4 and 5, the rear seat 4 and front seat 5 presenting the usual appearance when the parts are compacted and arranged for normal use as in Fig. 1.

By the utilization of novel combinations and features the respective seats may be extended and re-located to form an upper and a lower berth, the former at the top of the body of the automobile, and the latter on the bottom or floor of the automobile.

The rear seat is adapted to be utilized as a part of the lower berth, and for this purpose the seat board 7 upon which the seat cushion 8 rests, is hinged to the base board 9 at 10, and in turn the base board 9 is hinged or pivoted to the floor 1 at 11. In normal position, the seat-board rests upon a strip or ledge 7' on the back of the body of the car, as a support, the front support for the seat board being provided by the base board 9, and the horizontal seat portion 7 may be secured and held in position by suitable latches or slide bolts 7ª engaging the sides of the car in well known manner.

Within the interior of the rear seat is carried a cushion 12, preferably attached at 13 to the underside of the seat board 7, and compactly arranged as in Fig. 1 when not in use, but extensible as indicated in Figs. 2 and 3, with the foldable boards 7 and 9 of the rear seat. Thus it will be apparent that the seat board 7 may be detached, after removal of the cushion 8, from the supporting strip 7', and swung on its hinge 10 while the base board 9 is being swung on its pivot 11, as indicated in Fig. 2, to bring these boards to extended position to lie flat upon the bottom or floor of the automobile or vehicle, as in Fig. 3, with the special cushion 12 on top of these two boards, and lying also on the floor of the car or automobile at the rear.

In conjunction with the rear seat structure I also utilize a hinged bottom board 14, located near the front of the automobile, and hinged at 15 on the floor of the car, the hinge extending transversely of the car as indicated. A berth cushion 16 is attached to the bottom board 14, and extends forward of the car, on the floor, under the front seat structure as shown, and it will be obvious that when the bottom, hinged board 14 is turned down flat on the floor of the car, with its cushion 16, it will form a continuation of the foldable boards 7 and 9 and the cushions 12 and 16 will provide a continuous, comfortable bedding or mattress on the floor of the car, as illustrated in Fig. 3. In usual or normal position the hinged bottom board 14 stands erect or in vertical position, as in Fig. 1, within the structure of the front seat 5, and this board and the cushion 16 are thus hidden from sight.

The base board 17 of the front seat is fixed as indicated in the drawings and may be used as the foot board of the lower berth or bed when the latter is made up as shown in Fig. 3.

The front seat structure includes a transversely disposed rectangular metallic frame 18, bolted firmly to the bottom or floor of the car and secured also to the sides of the body of the car, to form a brace for the latter, and a support for the members of the front seat 5, the frame being a box-like structure open at the front and rear and extending the full width of the automobile.

In the rear opening of the frame 18 a panel 19 is hinged as at 20 to the rear top edge of the frame, in position to hang in and close the rear of the frame and form the back part of the front seat structure. The pivoted panel 19 has hinged thereto a panel 21, the joint being indicated at 22, and this hinge joint extends the full length of the two panels, the hinge panel 21 being equipped with a cushion portion 23, and adapted to stand erect and parallel with the pivoted panel 19, but within the frame 18, when in normal position. Suitable catches or fastening devices (not shown) may be utilized to hold these parts in position within the frame 18, and the fit of the panels within the frame is such as to present a workmanlike and pleasing appearance. The two panels 19 and 21 are adapted to be swung up to horizontal position, with the free end of panel 21 resting on the top edge 24 of the back portion of the automobile, as in Fig. 3, to form a portion of the upper berth or bed. Thus this portion of the upper berth is suspended between the rear edge 24 of the automobile, and the rear edge at the top of the frame 18, the hinge joint 22 being at the underside of the two panels when they are in horizontal extended position in order that the square edges of the joint between the two panels will prevent sagging of the panels at the joint.

At the front of the rectangular frame 18 another panel as 25, is pivoted, the pivot point extending along the edge as 26 of the frame throughout its full width, and this panel 25 is adapted to support the back board 27 of the front seat 5. The back board is movable relatively to the panel 25, and the latter is provided with end brackets 28, slotted to receive and guide the slide T-heads or tongues 29 complementary thereto and attached at the rear side of the back board 27. The seat board 30 of the front seat 5 is hinged at 31 to the back board 27 and provided with a seat cushion 32, the back board of the front seat being upholstered with a similar cushion 33. Now it will be obvious that the front seat members may be elevated and swung to horizontal position to complete the remainder of the upper berth, and to accomplish this purpose, the front hinged panel, with the seat board 30 swung to position indicated in Fig. 2, to clear the steering wheel and post, is turned on its hinge or pivot 26 to bring the panel to horizontal position. Then the back-board 27, through its slide connection with the panel 25, is slid to the rear until its free edge or top edge abuts against the rear pivoted panel at hinge joint 20, with the back board resting upon the top of the frame 18, and the hinged seat board 30 held erect by suitable devices (not shown) to be utilized as the foot board of the berth. The mattress for the upper berth is composed of the fixed upholstery 23 on the hinged panel 21, the rear seat cushion 8, the front seat cushion 32 and the fixed upholstery 33 on the back-board of the front seat 5. The movements of the parts as they are swung to operative position are indicated in Fig. 2, and in Fig. 3 the completed upper berth is shown in position for use.

The hinged panel 25 is equipped with a pair of slide bolts 34, 34' as best seen in Fig. 7 to engage keepers or sockets 35 indicated in Fig. 1 and hold the panel in horizontal position to support the user of the berth. These alined slide bolts are movable in brackets 36 secured to the panel, and a turning knob 37 extends through an opening in the panel, with its arms 38 connected by links 39 to the bolts. Thus by turning the knob the two bolts may be drawn toward one another to release them, or protracted or projected to engage their keepers 35 to support the panel. To hold the bolts projected a detent 40 is provided on one of them, and the pivoted pawl 41 is utilized to engage the detent, but may be released therefrom by turning the release knob 42 which is connected by link 43 to the pawl.

In Fig. 1 the seats are illustrated in normal position for use, with the mattress sections or cushions 12 and 16 stowed away within the respective rear and front seats, and the seat cushions 6, 8, 32, and 33 in their proper places for use. When making up the berths the seat bottom cushions 8 and 32 are removed, the pivoted and extensible seat members are extended to position for use, and then the cushions are placed in the bed or berth mattresses are placed in position as illustrated, and the berths ready for occupancy. Either one or both of the berths may be made up for use as desired, and it will be apparent that the conversion of the seats from one use to another may be accomplished with facility and convenience.

Having thus fully described my invention, what I claim is—

1. The combination with the vehicle body, of a rectangular transversely disposed frame, a panel pivoted at the upper rear edge of said frame and a foldable panel hinged on the first panel, said panels adapted to swing up to horizontal position and be supported on the vehicle body, and a sectional, foldable front seat member supported at the front of said frame adapted to co-act with said panels to form a berth, as described.

2. The combination with a vehicle body, of a transversely disposed pivoted panel, and a second panel hinged on the first panel, said panels adapted to swing to horizontal position and be supported on the vehicle body, movable front seat members comprising a pivoted panel, a seat back supported on and movable relative to said last panel, and a seat-board hinged to said seat back, whereby the seat members may be swung to horizontal position and be supported to co-act with said first mentioned pair of panels to form a berth as described.

3. The combination with a vehicle body and extensible members to form a portion of a berth, of a sectional, extensible, seat to co-act therewith and comprising a pivoted panel, a seat back-board suspended thereon and a seat-board hinged to said back-board, and means for supporting the seat-board.

4. The combination with a vehicle body and extensible members to form a portion of a berth in connection therewith, of a transverse inclosing frame, a panel pivoted at the top of the frame to form a rear closure, a second panel hinged to the first panel and said panels adapted to swing to position to co-act with said extensible members, and a foldable front seat adapted to co-act with said panels comprising a pivoted member on the frame, a seat back slidable on said pivoted member longitudinally of the vehicle, and a seat board hinged to said seat back.

5. The combination with a vehicle body and extensible members to form a portion of a berth, of a sectional, extensible seat to co-act therewith comprising a transverse frame, a panel pivoted in the frame, a seat back board supported and slidable on said panel longitudinally of the vehicle, a seat board hinged on said pivoted panel, said members, panel, and boards adapted to be moved to horizontal position, and means for supporting the combined device to form a berth.

6. The combination with a vehicle body, of an openable sectional rear seat adapted to inclose a floor mattress and be extended on the floor of the car to support said mattress, an inclosing, openable, front seat structure and berth members within said structure adapted for extension upon the floor to co-act with the rear seat devices to form a berth.

7. The combination with a vehicle body of convertible seats adapted to form a floor berth comprising a rear seat structure composed of a base board hinged to the floor of the vehicle and a seat board hinged at the free end of said base board; an inclosing, openable front seat structure comprising a hinged floor board normally standing in erect position in the front seat structure; said seat board, base board, and floor board adapted to be extended flat upon the vehicle floor to form a berth.

LORENZO B. WELCH.